3,778,285

HIGH K DIELECTRIC PRINTING PASTES

Daniel W. Mason, West Peabody, Mass., assignor to Owens-Illinois, Inc.

No Drawing. Application Jan. 18, 1971, Ser. No. 107,566, now Patent No. 3,679,440, dated July 25, 1972, which is a continuation-in-part of abandoned application Ser. No. 54,591, July 13, 1970. Divided and this application Jan. 27, 1972, Ser. No. 221,426
Int. Cl. C08b *27/42, 27/04*
U.S. Cl. 106—179 14 Claims

ABSTRACT OF THE DISCLOSURE

Unique dielectric compositions may be used to formulate thick film pastes for printing microelectronic capacitors. The resulting dielectrics exhibit dielectric constants greater than about 500 and capacitances greater than about 80,000 picofarads per square inch at a thickness of at least about 1.0 mil. The unique dielectric compositions comprise about 55–76 percent by weight of a ferroelectric material and 45–24 percent of a glass binder. The glass binder employed comprises a lead barium borosilicate glass and a ferroelectric material previously dissolved therein. The composition is formulated into a printing paste by first dissolving 20–30 percent by weight ferroelectric into 70–80 percent by weight lead barium borosilicate glass binder, cooling the newly formed glass to a solid state, comminuting the glass to a particle size of less than about 1 micron and thereafter admixing the comminuted glass with the same particulate ferroelectric in an amount as indicated. This admixture is then added to a liquid organic carrier vehicle to formulate the printing paste. The printing paste is then printed into a chosen design and fired at a temperature of approximately 1,000–1,050° C. to produce a highly dense, uniform, and substantially crack-free dielectric material.

This application is a divisional application which was formerly copending with and emanated out of U.S. application Ser. No. 107,566, filed Jan. 18, 1971, and issued July 25, 1972 as U.S. Pat. No. 3,679,440; and which latter application was in turn, formerly copending with and emanated as a continuation-in-part application out of U.S. application, Ser. No. 54,591, filed July 13, 1970, and now abandoned.

This application relates to dielectrics. More particularly, this application relates to dielectric compositions which may be used to formulate printing pastes which in turn are used to produce capacitors for microelectronic circuitry.

Dielectric materials may generally be segmented into three separate classes according to the dielectric constants exhibited. The three classes usually recognized are low K dielectrics, medium K dielectrics and high K dielectrics (K=dielectric constant). Low K dielectrics may generally be characterized by dielectric constants less than about 50. Medium K dielectrics may be characterized by dielectric constants of about 50–150, while high K dielectrics generally are characterized by dielectric constants above about 150 and generally above about 500.

The prior art has long recognized the many useful purposes to which high K dielectrics, as defined above, can be put. Because of the many uses and thus high demand for such high K dielectrics, the art has sought to provide these materials usually in the form of devitrified glasses or ceramic ferroelectric compositions either crystallized or pressure pressed with a glass binder. Such materials are provided, furthermore, usually in the form of discrete discs which may then be placed between two conducting electrodes, as for example, to form a capacitor.

While these dielectric materials have generally exhibited the necessary high K values, capacitances, and dissipation factors required, the need to devitrify and/or subject these compositions to extremely high pressures, and to provide these compositions as preformed discs, detrimentally affects the number of uses to which they may be put. As a further detriment, these known prior art materials generally cannot readily be made into printing pastes because the temperatures at which they must be fired exceed those which may be used in conventional printing paste equipment and processes. That is to say, one of the serious drawbacks attendant with these known prior art high K value dielectrics is that their firing temperatures exceed about 1100° C. At such high temperatures, not only are special ovens required to provide the necessary firing temperatures, but special conductor materials are needed, for example, where capacitors are to be formed, in order to withstand such high firing temperatures without adversely affecting their conductive properties.

Upon occasion, as exemplified by U.S. Pat. No. 3,293,-077, the art has attempted to admix a glass binder of the borosilicate type with a ferroelectric material and a carrier vehicle in order to form a printing paste which may be used to print dielectric laminate in microelectronic capacitors. Such pastes generally include a relatively low amount of glass and a relatively high amount of ferroelectric, i.e., usually about 10 percent by volume glass, the remainder ferroelectric. While the requisite firing temperatures of below about 1100° C. are obtained so that conventional firing equipment and conductor materials may be used and dielectric constants of about 500 or greater are achieved, such materials generally are found to lack the requisite compatibility between ferroelectric and glass binder to prevent cracking and/or to achieve the requisite degree of electrical characteristics such as low dissipation, temperature coefficient of capacitance, and the like.

It is, therefore, quite evident from the above that there exists a definite need in the art for a dielectric composition which may be used to formulate printing pastes particularly for printing dielectric layers in microelectronic circuitry, which compositions in their paste form may be fired at conventional printing paste firing temperatures such that special equipment is not necessary and conventional conductors may be used in combination therewith. In addition, the dielectrics so formed must exhibit the necessary high K quality desired as well as to exhibit acceptable dissipation factors, temperature coefficients of capacitance, which stem generally from a system wherein compatibility between the glass binder and particulate dielectric is achieved. Furthermore, such dielectrics in order to truly solve the above-described need in the art must exhibit, at conventional printing thicknesses (about 1–1.5 mils final fired line), the requisite capacitances, usually in the order of about 80,000 picofarads per square inch, or greater.

Generally speaking, this invention fulfills the above-described need in the art by providing a unique glass binder comprised of a glass composition in which a ferroelectric material has been predissolved. Such a binder is then uniquely adaptable since the dispersed ferroelectric material thereafter included is more readily adapted within the structure upon final firing. By providing, then the unique binder containing a predissolved amount of ferroelectric material, the requisite properties of high quality capacitors as described are achieved at relatively low firing temperatures.

While the range of ingredients may vary widely within the purview of this invention as different systems are employed, for most purposes and preferably the unique dielectric compositions of this invention comprise from about 55–76 percent by weight of a ferroelectric and from about 45–24 percent by weight of a glass binder. The glass binder contemplated by this invention comprises about 70–80 percent by weight of a lead barium borosilicate glass and from about 20–30 percent by weight of a ferroelectric dissolved in said lead barium borosilicate glass. As stated hereinabove, because of the predissolution of a ferroelectric in the glass, which preferably is the same ferroelectric as that used in discrete undissolved particulated form, high compatibility between the glass binder and particulate ferroelectric is achieved in the final product.

Such dielectric compositions may be comminuted into small particle size of less than 1 micron and admixed with conventional liquid organic carrier vehicles in a known manner to produce printing pastes which are particularly applicable for printing dielectric lamina in microelectronic circuitry.

When such pastes are printed in thicknesses of about 1.0–1.5 mils and are fired at a temperature of about 1,000–1,050° C. in accordance with conventional firing techniques for microelectronic circuitry, a dielectric material is provided which exhibits a dielectric constant (K) of greater than about 150, in many instances greater than about 500 and in preferred instances greater than about 800. In addition, the dielectric so fired exhibits a capacitance usually greater than 80,000 picofarads per square inch at a thickness of 1.0–1.5 mils and in certain instances as great as about 200,000 picofarads/in.$^2$ at 1.0 mil thickness, a dissipation factor of less than about 3.0 percent measured at 1 Hz. and a measured temperature coefficient of capacitance of about +300 to +2000 p.p.m. at 25–110° C. Furthermore, the dielectrics of this invention are moisture resistant even when subjected during storage or operation to high temperature and humidity conditions.

The ferroelectric materials contemplated for use in this invention include any of the well-known ferroelectrics such as barium titanate, strontium titanate, calcium titanate, magnesium titanate, strontium zirconate, calcium zirconate, magnesium zirconate, the niobates such as calcium niobate, the ceriates such as magnesium ceriate, or admixtures thereof. A particularly preferred ferroelectric material for the purposes of this invention is a ferroelectric having a metallic analysis by weight of about 0.5 percent Al, about 0.15 percent Ca, about 1.0 percent Ce, about .05 percent Mg, about 0.5 percent Nb, 0.15 Si, 0.3 Sr, greater than about 10 percent Ti and about 5.0 percent Zr, and consisting essentially of a mixture of metallic titanates, zirconates, niobates, and ceriates in accordance with their metallic analysis. Such a material may be purchased under the trademark Tamtron 5037 from National Lead Company.

Any of the well-known lead barium borosilicate glasses may be used as a glass binder for the purposes of this invention. Generally speaking, however, it is preferred to use a glass having the following composition by weight percent:

| | Preferred range | Specific example |
|---|---|---|
| Ingredient: | | |
| $SiO_2$ | 5–25 | 15 |
| $B_2O_3$ | 5–20 | 10 |
| PbO | 25–50 | 40 |
| BaO | 10–30 | 20 |
| ZnO | 10–25 | 15 |

As hereinbefore stated, the dielectric compositions of this invention are formulated by first dissolving a ferroelectric material in the lead barium borosilicate glass so as to form an entirely new glass composition. Because of the high dielectric constant of the ferroelectric material, the new glass has a dielectric constant greater than that of the lead barium borosilicate glass. In addition to raising the dielectric constant and more importantly, the dissolving of a ferroelectric in the lead barium borosilicate glass prior to admixing the glass with the dominant amount of particulate ferroelectric serves to increase the compatibility of the glass binder and the ferroelectric. In this respect, compatibility is usually optimized if the same ferroelectric material is used for dissolving as is to be used for particulate purposes. Compatibility is extremely important for the purposes of this invention since high compatibility results in high density and a crack-free structure, thus maximizing K and minimizing dissipation, even though temperatures less than about 1100° C. are used for firing. Other characteristics such as stability, reliability, mechanical strength, and the like are also optimized.

As stated hereinbefore, the new glass binder contemplated is formulated from about 70–80 percent lead barium borosilicate glass and about 20–30 percent by weight of a ferroelectric material dissolved in said borosilicate glass. Dissolution of the ferroelectric material may be accomplished by adding the ferroelectric in particulate form to the raw batch ingredients which make up the lead barium borosilicate glass and thereafter smelting the entire mix at the requisite temperature of about 800 to 1000° C. to formulate the final, homogeneous glass product. Alternatively, particles of the ferroelectric material may be admixed with fritted lead barium borosilicate glass and thereafter melted at about 700–800° C. for a sufficient period of time, usually about 1–2 hours, to form a homogeneous glass. Regardless of whether the glass binder is formulated by adding the ferroelectric to batch ingredients or to the glass frit, the admixture is heated for a sufficient period of time and at a sufficient temperature to destroy the crystalline nature of the ferroelectric material and thoroughly dissolve it in the lead barium borosilicate glass so as to produce a substantially homogeneous, amorphous, non-crystalline glass.

While the amounts of glass binder and ferroelectric material dissolved therein may be varied for any given particular system over a relatively wide range depending upon the characteristics of the ultimate dielectric desired and the actual firing temperature used, the above-indicated ranges have been found to provide the requisite compatibility characteristics, including more similar coefficients of expansion, for strongly binding, in a substantially crack-free, non-porous manner, the ferroelectric particles within the new glass binder.

A particularly preferred glass binder composition for the purposes of this invention, because of its compatible coefficients of expansion, with the ferroelectric particles is a composition which consists essentially of 75 percent by weight lead barium borosilicate glass and 25 percent by weight particulate ferroelectric.

The new glass binder in amorphous non-crystalline form is usually cooled from its melt after dissolving the ferroelectric therein and quenched to frit the glass. Thereafter, the glass is comminuted, as by ballmilling, in order to render it of a particle size adaptable for admixing with the ferroelectric particulate material. Average particle sizes for all ingredients generally contemplated by this invention are less than about 2 microns (i.e., at least 50% of material has a particle size less than about 2 microns).

The so-prepared particulate, new glass binder is then admixed with the requisite amount of particulate ferroelectric material. As stated hereinabove, the ferroelectric material is usually added in an amount of from 55–76 percent by weight, the remainder of the composition being about 45–24 percent by weight particulate new glass binder. Two particularly preferred compositions for the purposes of this invention consist of (1) 74 percent by weight Tamtron 5037 and 26 percent by weight of said new glass binder and (2) 67.5% by weight Tamtron 5037 and 32.5% by weight of said new glass binder.

Generally speaking, the use of less than about 24 percent by weight glass binder results in porosity in the fired structure which detrimentally affects mechanical strength and decreases the dielectric constant. Using amounts greater than about 45 percent of new glass binder limits the amount of ferroelectric particles to a level where the requisite dielectric constant is not obtained. Therefore, while the amounts of ferroelectric particles and new glass binder employed may vary outside of the above given ranges, for most systems, and in order to obtain a high dielectric constant of greater than about 150, preferably greater than about 500 and in some instances as high as 800 or more, acceptable dissipation factors, capacitances, and measured temperature of coefficient of capacitance, the material should be added within the above-recited given range.

The so-formed admixtures of a ferroelectric material and a new glass binder, which constitute the dielectric compositions of this invention, may then be formulated into a dielectric printing paste by admixing the particles with a conventional liquid organic carrier vehicle. Any of the well-known liquid organic carrier vehicles may be used for the purposes of this invention. A preferred liquid organic carrier vehicle contemplated herein consists of two parts by weight butyl Carbitol acetate (diethylene glycol, monobutyl ether acetate) and one part by weight of iso-amyl salicylate. This thinner may be used alone or preferably admixed with a thickener such as ethyl cellulose. A particularly preferred vehicle for the purposes of this invention consists of 10 percent by weight N-4.8 ethyl cellulose and 90 percent by weight of the indicated amounts of butyl Carbitol acetate and iso-amyl salicylate. Another particularly preferred vehicle consists of 5% by weight N-200 ethyl cellulose and 95% of the indicated amounts of butyl Carbitol acetate and iso-amyl salicylate.

While the liquid organic vehicle can be added to the particulate matter in any given amount, depending upon the desired viscosity for printing purposes, and the like, it is preferred to add the liquid organic vehicle in an amount by weight of about 25 percent vehicle to about 75 percent by weight particulate matter, weight percents being based upon the total paste composition.

The pastes of this invention may be used in printing techniques well-known to the art in order to provide the requisite dielectric lamina required. However, it is preferred for the purposes of this invention to use these pastes for printing dielectrics in microelectronic circuitry. The pastes of this invention when so printed in accordance with conventional techniques are fireable at about 1,000–1,050° C. to highly dense, strong, non-porous structures having the requisite characteristics discussed hereinabove.

In a preferred manner of formulating a microelectronic capacitor, for example, a conventinal conductor material, such as a palladium-gold conductor, is prefired onto a ceramic dielectric substrate in accordance with conventional techniques. Thereafter, the pastes of this invention may be screen-printed thereon using the requisite number of screen-printings and separate firing steps to achieve a thicknes of about 1.0–1.6 mils. The screens or masks employed are usually of a mesh size of about 165–325. The firing temperature, as stated above, is 1,000–1,050° C. and firing is usually conducted by employing a 5–15 minute peak temperature with an 8 minute to 15 minute heat up and cool down cycle. However, any of the conventional firing techniques may be used, the hereinbefore described one merely being preferred. Thereafter, a top conductor again of known conventional composition, is fired or co-fired upon the final dielectric material using a firing temperature conventionally of about 700–1,050° C. (depending on whether fire or co-fire employed) to thus form a capacitor.

A particularly preferred firing procedure when using the above-indicated paste in a Pd-Au conductor is to first fire the Pd-Au conductor on a ceramic base substrate using a temperature of about 700–1,000° C. Thereafter, the above-described pastes of this invention are screened, dried, fired, screened (in a second screening step), dried, top electrode screened (in a third screening step), dried, and co-fired, all firing taking place at between 1,000–1,050° C. at peak for 10 minutes with an 8 to 10 minute cool off and heat up period. This procedure assures co-firing of top conductor. In another preferred modification where the top conductor is separately fired, the material is merely fired after the third drying step. Thereafter, a top conductor usually of the same type as the initial bottom conductor is printed upon the dielectric and fired at a temperature of 700–1,000° C. It is one of the unique aspects of this invention that the dielectrics of this invention remain unaffected in their dielectric properties by refiring, i.e., when being subjected to the firing temperatures of the top conductor.

Resulting dielectrics so formed in accordance with this invention are extremely dense, crack-resistant, non-porous and have the requisite electronic characteristics as described. While small portions of the ferroelectric particles dissolve during firing in the surrounding new compatible glass binder, thus adding to the good binding effect achieved by this invention, the ferroelectric particles remain substantially as discrete particles surrounded by a continuous phase of said amorphous glass binder. Because of the initial dissolution, preferably of the same ferroelectric material into the glass to form the new glass binder, the coefficient of expansion of the discrete ferroelectric crystals are more readily compatible with the coefficient of expansion of the continuous amorphous glass binder thus to prevent cracking upon cooling during the firing, cool down period and thereafter during use. As an example of the change effected by adding 25 percent Tamtron 5037 to the specific lead borosilicate glass recited hereinabove, the original glass had a coefficient of expansion of about $83\times10^{-7}$ in./in./° C. Tamtron 5037 has a coefficient of expansion of about $120\times10^{-7}$ in./in./° C. Without initial dissolution of at least 20 percent Tamtron into the glass to form a new glass binder, cracking of the dielectric structure occurs. On the other hand, with the dissolution of 25 percent Tamtron 5037 in the glass, the new glass binder has a coefficient of expansion of about $92\times10^{-7}$ in./in./° C., which is sufficiently compatible with the Tamtron to prevent cracking from occurring between the Tamtron particles and the glass binder in the final product.

EXAMPLE I

A glass binder for use in dielectric printing pastes is formulated by admixing 75 grams of a fritted previously prepared lead barium borosilicate glass consisting of by weight, 15% $SiO_2$; 10% $B_2O_3$; 40% PbO; 20% BaO; and 15% ZnO with 25 grams of Tamtron 5037. This admixture is heated at a temperature of about 800° C. for 1½ hours to form a homogeneous amorphous noncrystalline glass. The melted glass is then quenched in water and then ballmilled to an average particle size of about 0.6–0.8 micron. The coefficient of expansion of the original lead barium borosilicate glass was about $83\times10^{-7}$ in./in./° C. while the coefficient of expansion of the barium titanate ferroelectric material was $120\times10^{-7}$ in./in./° C. The coefficient of expansion of the resulting new binder glass particles formulated is $92\times10^{-7}$ in./in./° C.

The particulate glass binder material so formulated is admixed with Tamtron 5037 particles in an amount of 26 grams of said particulate glass with 74 grams of Tamtron 5037. The dry batch is then thoroughly mixed and thereafter there is added thereto 33.3 grams of a liquid organic vehicle consisting of 10 percent by weight N-4.8 ethyl cellulose and 90 percent by weight of 2 parts by weight butyl Carbitol acetate and one part by weight isoamyl salicylate to form a printing paste.

This printing paste is then used with a standard printer and a 230 mesh screen having an emulsion thickness of 0.5 mil to print a pad of said paste of 0.1 square inch in area on a conventional prefired Pd-Au conductor previously fired upon an alumina substrate. The paste pad is then dried at about 125° C. for 10 minutes and fired at about 1,025° C. for 5 minutes at peak with a total firing time of 25 minutes. Onto this initially printed pad is reprinted and refired two more pads similarly as the first pad so as to form, after firing, a dielectric line of 1.5 mils in thickness. A top Pd-Au conductor is then fired at about 1,000–1,025° C., using the same firing cycle, onto the top of the dielectric pad. The resulting capacitor product is a dense, crack-free, dielectric capacitor with a capacitance (C) of 100,000 picofarads/in.$^2$, which has a dissipation factor of less than 2 percent measured at 1,000 Hz. and a measured temperature coefficient of capacitance of about +300 to +600 p.p.m. at 25–100° C. The dielectric constant is 600.

EXAMPLE II

A glass binder for use in dielectric printing pastes is formulated by admixing 25 parts by weight Tamtron 5037 (average particle size of 1.85 microns) with 75 parts by weight of a glass making batch consisting of:

| Batch ingredient | Ingredient on oxide basis | Parts by weight on oxide basis |
|---|---|---|
| Ottawa 290 sand | $SiO_2$ | 15 |
| Boric anhydride | $B_2O_3$ | 10 |
| Red lead | PbO | 40 |
| Barium carbonate | BaO | 20 |
| Zinc oxide | ZnO | 15 |

The batch was smelted at 2500° F. for two hours and 20 minutes in a platinum crucible to form a molten glass and then annealed at 900° F. for one hour. The resulting glass was then water-fritted and ground to an average particle size of about 1.5 microns to form a glass binder powder.

The glass binder powder so formed was admixed with Tamtron 5037 particles having an average particle size of about 1.85 microns in an amount of 32.5 grams of glass binder powder with 67.5 grams of said Tamtron particles. The dry batch is then thoroughly mixed and thereafter there is added thereto 33.3 grams of a liquid organic vehicle consisting of 5% by weight N-200 ethyl cellulose and 95% by weight of 2 parts by weight butyl Carbitol acetate and one part by weight iso-amyl salicylate to form a printing paste.

This printing paste is then used with a standard printer and a 165 mesh screen having an emulsion thickness of 0.5 mils to print a pad of said paste of 0.1/in.$^2$ on a conventional prefired Pd-Au conductor previously fired upon an alumina substrate. The paste pad is then dried at about 125° C. for 10 minutes and fired at about 1,050° C. for 7.5 minutes at peak with a total firing time of 45 minutes. Onto this initially printed and fired pad is reprinted a second layer of said dielectric material which is dried and a top conductor printed thereupon. Co-firing is then accomplished at the same temperature and times as above. The resulting capacitor product is a dense, crack-free, completely sealed dielectric capacitor with a capacitance of (C) of 200,000 picofarads/in.$^2$ and having a thickness of 1 mil. In addition, the dielectric has a dissipation factor of less than about 2.5% measured at 1,000 Hz. and a measured temperature coefficient of capacitance of about +1500/p.p.m./°C. from 25–100° C. The dielectric constant is about 800. In addition, a humid test (1000 hours at 85° C. at a relative humidity 95%+) showed negligible changes in properties indicating high moisture resistance.

EXAMPLE III

In order to demonstrate the uniqueness of the new glass binder of this invention, a series of dielectric pastes were formed using substantially the same procedure as set forth in either Example I or Example II above except that in certain instances, no ferroelectric material was dissolved in the glass binder prior to admixture of the glass binder with the ferroelectric particles. The glass composition and ferroelectric used were the same as those of Examples I and II. The following are the results of this experimentation:

TABLE A

| Experiment number | Example procedure | Wt. percent ferroelectric to binder | Glass binder used | Characteristics of resulting capacitor |
|---|---|---|---|---|
| 1 | 1 | 70/30 | No ferroelectric predissolved | C=100,000 pf./in.$^2$, considerable incidence of shorts, numerous cracks. |
| 2 | 1 | 65/35 | do | C=70,000 pf./in.$^2$, high incidence of shorts, numerous cracks. |
| 3 | 1 | 75/25 | do | C=105,000 pf./in.$^2$, high incidence of shorts, numerous cracks. |
| 4 | 1 | 80/20 | do | C=70,000 pf./in.$^2$, high indcidence of shorts, high porosity, numerous cracks. |
| 5 | 1 | 75/25 | Pre-dissolved ferroelectric | C=90,000 pf./in.$^2$, no cracks, good density no porosity. |
| 6 | 1 | 76/24 | do | C=80,000 pf./in.$^2$, no shorts, good but lesser density some small porosity, no cracks. |
| 7 | 1 | (1) | do | Little or no sintering at firing temperatures of 1,000-1,025° C. |
| 8 | 2 | 70/30 | No pre-nissolved ierro-electric | C=46,000 pf./in.$^2$, fired 1,000° C./5 min. |
| 9 | 2 | 70/30 | do | C=35,000 pf./in.$^2$, fired 1,050° C./5 min. |
| 10 | 2 | 65/35 | Pre-dissolved ferroelectric | C=118,000 pf./in.$^2$, fired 1,050° C./5 min. |
| 11 | 2 | 60/40 | do | C=110,000 pf./in.$^2$, fired 1,050° C./5 min. |
| 12 | 2 | 74/26 | do | C=31,000 pf./in.$^2$, fired 1,000° C./5 min. |
| 13 | 2 | 67.5/32.5 | do | C=69,000 pf./in.$^2$, fired 1,000° C./5 min. |
| 14 | 2 | 62.5/37.5 | do | C=76,000 pf./in.$^2$, fired 1,000° C./5 min. |
| 15 | 2 | 74/26 | do | C=59,000 pf./in.$^2$, fired 1,050° C./5 min. |
| 16 | 2 | 67.5/32.5 | do | C=95,000 pf./in.$^2$, fired 1,050° C./5 min. |

1 Less than 24% binder.

Once given the above disclosure, many other features, modifications and improvements will become apparent to the skilled artisan. Such other features, modifications and improvements are therefore considered to be a part of this invention, the scope of which is to be determined by the following claims:

I claim:

1. A dielectric printing paste suitable for microelectronic circuitry printing comprising an admixture of
   - a particulate glass binder composition of substantially homogeneous non-crystalline glass having about 70–80 percent by weight of a lead barium borosilicate glass with about 20–30 percent by weight of a ferroelectric material selected from the group consisting of metallic titanates, zirconates, niobates, ceriates and admixtures of these materials, homogeneously dissolved in said particulate glass binder composition,
   - a ferroelectric material selected from the group consisting of metallic titanates, zirconates, niobates, ceriates and admixtures of these materials, and
   - a liquid organic carrier vehicle.

2. A printing paste in accordance with claim 1 wherein said lead barium borosilicate glass comprises about 5–25 percent by weight of $SiO_2$, about 5–20 percent by weight of $B_2O_3$, about 25–50 percent by weight of PbO, about 10–30 percent by weight of BaO, and about 10–25 percent by weight of ZnO.

3. A printing paste in accordance with claim 1 wherein said lead barium borosilicate glass consists essentially of 15 percent by weight $SiO_2$, 10 percent by weight $B_2O_3$, 40 percent by weight PbO, 20 percent by weight BaO and 15 percent by weight ZnO.

4. A printing paste in accordance with claim 2 wherein all particulate material has an average particle size less than about 2 microns and said ferroelectric materials are selected from the group consisting of barium titanate, strontium titanate, calcium titanate, magnesium titanate, strontium zirconate, calcium niobate, magnesium ceriate and mixtures of these materials.

5. A printing paste in accordance with claim 4 wherein said glass binder composition and said ferroelectric material are admixed together in a relative ratio range of about 45–24 percent by weight of ferroelectric material based upon the total combined amounts of glass binder composition and ferroelectric material admixed together in said printing paste.

6. A printing paste in accordance with claim 5 wherein said relative ratio of glass binder composition to ferroelectric material is about 32.5 percent by weight of glass binder composition to about 67.5 percent by weight of ferroelectric material.

7. A printing paste in accordance with claim 6 wherein said lead barium borosilicate glass consists essentially of 15 percent by weight $SiO_2$, 10 percent by weight $B_2O_3$, 40 percent by weight PbO, 20 percent by weight BaO and 15 percent by weight ZnO.

8. A printing paste in accordance with claim 7 wherein said ferroelectric material has a percent by weight metal analysis of about 0.5 percent Al, about 0.15 percent Ca, about 1.0 percent Ce, about 0.05 percent Mg, about 0.5 percent Nb, about 0.15 percent Si, about 0.3 percent Sr, greater than about 10 percent Ti, and about 5.0 percent Zr.

9. A printing paste in accordance with claim 1 wherein said glass binder composition is in particulate form having an average particle size of less than about 2 microns.

10. A printing paste in accordance with claim 1 wherein said glass binder composition and said ferroelectric material are admixed together in a relative ratio range of about 45–24 percent by weight of glass binder composition to about 55–76 percent by weight of ferroelectric material based upon the total combined amounts of glass binder composition and ferroelectric material admixed together in said printing paste.

11. A printing paste in accordance with claim 10 wherein said relative ratio of glass binder composition to ferroelectric material is about 32.5 percent by weight of glass binder composition to about 67.5 percent by weight of ferroelectric material.

12. A printing paste in accordance with claim 1 wherein said liquid organic vehicle comprises 2 parts by weight diethylene glycol monobutyl ether acetate and 1 part by weight iso-amyl salicylate.

13. A printing paste in accordance with claim 1 wherein said liquid organic vehicle consists essentially of 10 percent by weight N-4.8 ethyl cellulose, and 90 percent by weight of an admixture of 2 parts by weight diethylene glycol monobutyl ether acetate and 1 part by weight iso-amyl salicylate.

14. A printing paste in accordance with claim 1 wherein said liquid organic vehicle consists essentially of 5% by weight N-200 ethyl cellulose and 95% by weight of an admixture of 2 parts by weight diethylene glycol monobutyl ether acetate and 1 part by weight iso-amyl salicylate.

References Cited

UNITED STATES PATENTS

| | | | |
|---|---|---|---|
| 3,293,077 | 12/1966 | Kaiser et al. | 106—39 R |
| 3,414,417 | 12/1968 | Miller | 106—26 |
| 3,049,077 | 8/1962 | Damm | 106—23 |

OTHER REFERENCES

Journal of the American Ceramic Society, Bond Strength and Elastic Properties of Ceramic Adhesives, H. R. Thorton, vol. 45, No. 5, pp. 201–209, May 1967.

THEODORE MORRIS, Primary Examiner

U.S. Cl. X.R.

106—26, 39 R, 193 J; 117—70 B